(12) United States Patent
Nagae et al.

(10) Patent No.: US 9,120,168 B2
(45) Date of Patent: Sep. 1, 2015

(54) ELECTRODE FOR HONEYCOMB STRUCTURE FORMING DIE

(75) Inventors: Tomoki Nagae, Nagoya (JP); Hirofumi Hosokawa, Nagoya (JP); Masanari Iwade, Nagoya (JP); Seiichiro Hayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 782 days.

(21) Appl. No.: 13/316,876

(22) Filed: Dec. 12, 2011

(65) Prior Publication Data

US 2012/0152908 A1    Jun. 21, 2012

(30) Foreign Application Priority Data

Dec. 15, 2010    (JP) .................. 2010-279795

(51) Int. Cl.
| | | |
|---|---|---|
| *B23H 1/04* | (2006.01) | |
| *B23H 9/00* | (2006.01) | |
| *B23H 1/00* | (2006.01) | |
| *B23H 5/00* | (2006.01) | |
| *B32B 3/12* | (2006.01) | |
| *B23P 13/04* | (2006.01) | |

(52) U.S. Cl.
CPC .............. *B23H 9/00* (2013.01); *B23H 2200/30* (2013.01)

(58) Field of Classification Search
CPC .. B23H 2200/00; B23H 2200/30; B23H 1/04; B23H 7/26; B23H 7/265; B23H 7/20; B23H 1/022; B23H 7/18; B23H 1/00; B23H 7/10; B23H 7/02; B23H 7/22; B23H 9/12; B23K 9/013; B23K 35/0216
USPC ................. 219/69.15, 68, 69.1, 69.11, 69.12, 219/69.16, 69.17, 69.18, 69.2; 425/313; 428/116; 29/558, 890, 888.3, 527.2; 264/177; 75/235; 318/578; 419/2; 118/410; 501/80
See application file for complete search history.

(56) References Cited

U.S. PATENT DOCUMENTS

| | | | | | |
|---|---|---|---|---|---|
| 3,058,895 | A | * | 10/1962 | Williams | ........................ 205/653 |
| 3,905,743 | A | * | 9/1975 | Bagley | ........................ 425/464 |
| 4,290,743 | A | * | 9/1981 | Suzuki | ........................ 425/461 |
| 4,293,357 | A | * | 10/1981 | Higuchi et al. | ............. 156/89.22 |

(Continued)

FOREIGN PATENT DOCUMENTS

| | | |
|---|---|---|
| JP | 04-074131 B2 | 11/1992 |
| JP | 07-040149 A1 | 2/1995 |

(Continued)

OTHER PUBLICATIONS

Japanese Office Action (Application No. 2010-279795) dated Jan. 14, 2014.

(Continued)

*Primary Examiner* — Sang Y Paik
*Assistant Examiner* — Gyounghyun Bae
(74) *Attorney, Agent, or Firm* — Burr & Brown, PLLC

(57) ABSTRACT

By providing a honeycomb electrode, i.e., an electrode for a honeycomb structure forming die including a thick plate-like electrode base body made of an electricity discharging material and having two main surfaces, only one surface of two main surfaces of the electrode base body is provided with a plurality of electrode cells partitioned by electrode partition walls, and a shape of the electrode cells in the one surface is analogous to that of flow-through cells of the honeycomb structure.

14 Claims, 12 Drawing Sheets

(56) References Cited

U.S. PATENT DOCUMENTS

| | | | |
|---|---|---|---|
| 4,373,895 A * | 2/1983 | Yamamoto et al. | 425/461 |
| 4,465,454 A * | 8/1984 | Duerr et al. | 425/461 |
| 4,820,146 A | 4/1989 | Inoue et al. | |
| 5,139,596 A * | 8/1992 | Fell | 156/205 |
| 5,731,562 A * | 3/1998 | Beckmeyer et al. | 219/69.12 |
| 6,080,348 A * | 6/2000 | Shalkey | 264/177.12 |
| 6,299,813 B1 * | 10/2001 | Brew et al. | 264/177.12 |
| 6,732,621 B2 * | 5/2004 | Iwata et al. | 83/51 |
| 6,991,450 B1 | 1/2006 | Stephens, II | |
| 7,285,214 B2 * | 10/2007 | Ichikawa | 210/510.1 |
| 7,335,848 B2 * | 2/2008 | Hironaga et al. | 219/69.17 |
| 7,500,847 B2 * | 3/2009 | Takahashi et al. | 425/380 |
| 2002/0042344 A1 | 4/2002 | Kondo et al. | |
| 2002/0153356 A1 * | 10/2002 | Fujita et al. | 219/69.17 |
| 2003/0064126 A1 * | 4/2003 | Miyazaki et al. | 425/461 |
| 2005/0008818 A1 * | 1/2005 | Olszewski et al. | 428/116 |
| 2005/0198822 A1 | 9/2005 | Hironaga et al. | |
| 2005/0274097 A1 * | 12/2005 | Beall et al. | 55/523 |
| 2007/0231534 A1 * | 10/2007 | Ahmed et al. | 428/116 |
| 2008/0135141 A1 * | 6/2008 | Fujita | 148/712 |
| 2008/0196237 A1 * | 8/2008 | Shinya et al. | 29/557 |
| 2009/0081325 A1 * | 3/2009 | Kitamura et al. | 425/461 |
| 2010/0143529 A1 * | 6/2010 | Kitamura et al. | 425/464 |
| 2010/0244309 A1 * | 9/2010 | Hayashi et al. | 264/177.12 |
| 2011/0049103 A1 | 3/2011 | Humphrey | |
| 2011/0049107 A1 | 3/2011 | Humphrey | |

FOREIGN PATENT DOCUMENTS

| | | |
|---|---|---|
| JP | 08-187621 A1 | 7/1996 |
| JP | 2002-177794 A1 | 6/2002 |
| JP | 2002-273626 A1 | 9/2002 |
| JP | 2005-254345 A1 | 9/2005 |
| JP | 2010-234515 A1 | 10/2010 |

OTHER PUBLICATIONS

Japanese Office Action dated Jan. 15, 2013.
Extended European Search Report dated Apr. 3, 2012.

\* cited by examiner

ELECTRODE FOR HONEYCOMB STRUCTURE FORMING DIE

BACKGROUND OF THE INVENTION

1. Field of the Invention

The present invention relates to an electrode. The electrode is for use in processing a die. The die is used for forming a honeycomb structure.

2. Description of Related Art

A honeycomb structure is usually a ceramic product whose outer shape is a columnar shape or a prism shape. This honeycomb structure includes a plurality of cells partitioned by partition walls being made of a ceramic porous material and having a large number of pores, which has a honeycomb shape. Such a honeycomb structure, including the cells which become through channels of a gas, is often used as a filter or a catalyst carrier.

The honeycomb structure can be manufactured through extrusion forming by use of an extrusion forming machine including a honeycomb structure forming die for exclusive use (also simply referred to as die). This die is obtained by forming, in a die base body made of a pure metal, an alloy or the like, back holes (often referred to as the introduction holes) through which a forming raw material (often referred to as the kneaded clay) is introduced, and slits which communicate with the back holes. Each of the slits has a shape matching a sectional shape of the cells, and has a width corresponding to a thickness of each partition wall of the honeycomb structure. Each of the back holes has a width larger than each slit, and is provided at a position corresponding to an intersection of the slits. According to the extrusion forming by use of such a die, the forming raw material introduced through the back holes moves toward the slits each having a small width, is extruded through slit openings, and is discharged as a honeycomb-structure formed body (often referred to as the honeycomb formed body).

Moreover, the above die is obtained by forming the above slits and back holes in the die base body which is not provided with any slit or back hole, through electric discharge machining (EDM) using an electrode, cutting, grinding, electrolytic machining or the like.

For example, Patent Documents 1 and 2 disclose die manufacturing steps for obtaining a honeycomb structure including cells each having a hexagonal sectional shape. In the steps, a combtooth-like electrode (often referred to as the rib electrode) including a large number of thin flat plate-like projections adjusted to the slits (often referred to as ribs) is used. Moreover, the slits are processed by the electricity discharged from the thin flat plate-like projections in the electrode.

PRIOR ART DOCUMENT

Patent Document

[Patent Document 1] Japanese Patent No. 1784822
[Patent Document 2] JP-A-2005-254345

SUMMARY OF THE INVENTION

Problems to Be Solved by the Invention

In recent years, it has been requested to increase the density of cells as a through channel and reduce the thickness of porous partition walls in the honeycomb structure. For example, in the honeycomb structure including cells as a flow-through channel (hereinafter referred to as flow-through cells) each having a hexagonal sectional shape, it is required that the number of the flow-through cells is from 400 to 900 per square inch, a distance between two opposing sides of the hexagonal shape of each flow-through cell, i.e., the opposing side length is from 0.50 to 2.00 mm, and the thickness of each of the porous partition walls which define the flow-through cells is from 1.5 to 6 mils. One mil is about 0.0254 mm.

If the porous partition walls become thin, slits of a die have to be narrowed or thinned. Therefore, flat plate-like projections is required to be thinned also in a combtooth-like electrode (often referred to as rib electrode) for use in the electric discharge machining of the die. In this case, the breakage of the combtooth-like electrode easily occurs. For example, if the flat plate-like projections of the combtooth-like electrode break during the electric discharge machining, a shape of the obtained die becomes abnormal. When the honeycomb structure is formed by using the die having the abnormal shape, a shape of the (flow-through) cells of the obtained honeycomb structure also becomes abnormal, and yield of a ceramic product deteriorates.

The investigations of countermeasures under awareness of such problems have resulted in an idea that when the electrode is not a combtooth-like electrode or the rib electrode but has an electrode shape which is complementary to all or part of a die shape, the electrode does not easily break during the electric discharge machining, as compared with the combtooth-like electrode. Since the electrode is used for processing the slits by the electric discharge machining, the electrode strictly may be formed into the complementary shape to all or part of slit forming portions in the die.

However, for obtaining the honeycomb structure including porous thin partition walls, the slits of the die unchangeably have to be narrowed or thinned. Even when the electrode is formed into the complementary shape to the die in place of the combtooth-like shape, portions corresponding to the slits are required to be thinned. Therefore, even if the electrode does not break during the electric discharge machining, the electrode is deformed sometimes. In this case, the deterioration of the yield of the finally obtainable honeycomb structure, that is, the ceramic product cannot be avoided. Therefore, further improvements have been required.

The present invention has been developed in view of such situations. An object of the present invention is to provide an electrode which can obtain a die including thin or narrow slits by electric discharge machining and which does not easily cause breakage or deformation of the die during the electric discharge machining. As a result of repeated researches, it has been found that this object can be achieved by the following means to complete the present invention.

Means to Solve the Problems

That is, according to the present invention, there is provided an electrode for a honeycomb structure forming die which forms a honeycomb structure having a peripheral surface and two end surfaces, showing a column-like shape and including a plurality of flow-through cells partitioned by porous partition walls, the electrode comprising a thick plate-like electrode base body made of an electricity discharging material and having two main surfaces, only one of the two main surfaces of the electrode base body being provided with a plurality of electrode cells partitioned by electrode partition walls, wherein a shape of the electrode cells in the one surface is analogous to that of the flow-through cells of the honeycomb structure.

When it is described that the shape of the electrode cells in the electrode for the honeycomb structure forming die is analogous or resembles to that of the flow-through cells of the honeycomb structure, it is meant that the shape of one electrode cell is analogous to a sectional shape or an end surface shape of one flow-through cell. It is not meant that a configuration formed by the electrode partition walls and the electrode cells in the electrode for the honeycomb structure forming die is strictly analogous to a configuration formed by the porous partition walls and the flow-through cells in the honeycomb structure. However, it can be meant that the electrode partition walls in the electrode for the honeycomb structure forming die are different from the porous partition walls of the honeycomb structure only in thickness and that the configuration formed by the electrode partition walls and the electrode cells in the electrode for the honeycomb structure forming die is schematically similar and generally analogous to part or all of the configuration which appears on the end surface of the honeycomb structure or a section thereof vertical to an axial direction. Therefore, in the description of the present specification, the electrode for the honeycomb structure forming die will also be referred to as the honeycomb electrode.

The electrode for the honeycomb structure forming die according to the present invention is for use in the processing of the honeycomb structure forming die which is used for forming the honeycomb structure. That is, the electrode for the honeycomb structure forming die which forms the honeycomb structure is used for processing, i.e., manufacturing the die. And, this die is used for forming the honeycomb structure. More strictly, the die is a forming die for use in extruding a forming raw material or the kneaded clay made of a ceramic material as a main material before firing, to obtain a formed body having a honeycomb shape, i.e., the honeycomb formed body. In other words, the die is a die used for forming. However, since the expression "electrode for a die for forming a honeycomb structure" is verbose, in the description of the present specification, the electrode which is a manufacturing object of the present invention will be referred to as electrode for honeycomb structure forming die. Moreover, the terms "partition walls" and "cells" are also used to mean the electrode partition walls and the electrode cells, respectively, for the honeycomb electrode. Therefore, in the description of the present specification, the terms "porous partition walls" and "flow-through cells" are used in case of the honeycomb structure.

A shape corresponding to the sectional shape of the honeycomb structure appears on a die shape, and a shape corresponding to the die shape appears on a shape of the electrode for honeycomb structure forming die. Specifically, the shape of slits (recess portions) of the die is a complementary shape to that of the porous partition walls (projecting portions) of the honeycomb structure. Moreover, the shape of the electrode partition walls (projecting portions) of the electrode for honeycomb structure forming die is a complementary shape to that of the slits (recess portions) of the die. The complementary shape is a mutually compensating shape. The complementary shape is, for example, a shape integrated by fitting or engaging as in the recess portions and the projecting portions. However, the complementary shape in the present description is not necessarily limited to an engaged shape which does not have any gap. The electric discharge machining usually requires a machining margin, and hence a gap corresponding to the machining margin or a shift is allowed.

In the electrode base body, the electrode partition walls having the shapes corresponding to the porous partition walls are formed, and a plurality of electrode cells partitioned by the electrode partition walls appears on only one of two main surfaces of the electrode base body. Therefore, thus formed electrode is referred to as a honeycomb electrode including a plurality of electrode cells partitioned by the electrode partition walls in conformity to the honeycomb structure including the plurality of flow-through cells partitioned by the porous partition walls.

One of the two main surfaces of the electrode base body is any surface of the thick plate-like or may be referred to as rectangular parallelepiped electrode base body having two surfaces. Since the electrode base body has a thick plate-like shape, the surface thereof can be present also in a thickness direction, but the two main surfaces indicate two surfaces, i.e., the front surface and the back surface which are not disposed in the thickness direction. When the electrode cells are provided only in the one surface, it is meant that the electrode cells are open only in the one surface. When the plurality of electrode cells partitioned by the electrode partition walls are provided, all or part of the shape corresponding to the sectional shape or the end surface shape of the honeycomb structure appears. Since the electrode cells are open only in one of the two main surfaces of the electrode base body, the electrode cells are not open in the other surface. That is, the other surface is not provided with the electrode cells. However, the other surface can have a configuration where holes which are not the electrode cells are open.

The sectional shape of the honeycomb structure is a shape of a section which is vertical to the axial direction of the honeycomb structure whose outer shape is usually a columnar shape or a prism shape. In the electrode, all or part of the shape corresponding to the sectional shape of the honeycomb structure or the schematically similar shape may appear. This meaning is indicated, when it is described that the configuration formed by the electrode partition walls and the electrode cells in the electrode for the honeycomb structure forming die is schematically similar to part or all of the configuration which appears on the end surface of the honeycomb structure or the section thereof vertical to the axial direction. Similarly, in the die, all or part of the shape corresponding to the sectional shape of the honeycomb structure, i.e., a complementary shape may appear. When the electric discharge machining is performed by using a honeycomb electrode in which all of the shape corresponding to the sectional shape of the honeycomb structure appears on at least one surface, it is possible to complete the die at a time. The honeycomb electrode may be called as a full-size honeycomb electrode including a fringe portion (described in detail later). Moreover, when the electric discharge machining is performed by using a honeycomb electrode in which part of the shape corresponding to the sectional shape of the honeycomb structure appears on at least one surface, which may be called as a partial-size honeycomb electrode which does not include any fringe portion (described in detail later), it is possible to complete the die by repeatedly using the partial-size honeycomb electrode.

In the electrode for the honeycomb structure forming die according to the present invention, bottom portions of the electrode cells provided only in the one surface of the electrode base body preferably further include holes formed directed to the other surface of the two main surfaces of the electrode base body.

In a case where the electrode for the honeycomb structure forming die according to the present invention includes holes, the holes formed directed to the other surface of the two main surfaces of the electrode base body are preferably open toward the other surface. In this case, through holes are formed from the electrode cells which are open in the one surface through the holes which are open in the other surface. However, the shape of the electrode cells which appears on the one surface is different from the shape of the holes which appears on the other surface. A preferable shape of each electrode cell will be described later. There is not any special restriction on the hole shape as long as the shape is different from the electrode cell shape. For example, the hole shape may be a polygonal shape such as a quadrangular shape, but is preferably a round shape. In this case, these round holes communicate with the electrode cells.

When the electrode for the honeycomb structure forming die according to the present invention includes holes, the holes and the electrode cells are preferably provided in pairs, or each of the holes is preferably provided for a plurality of electrode cells. When it is described that the holes and the electrode cells are provided in pairs, it is meant that the holes and the electrode cells are provided on the basis of a one-to-one correspondence. When it is described that each of the holes is provided for the plurality of electrode cells, it is meant that the holes and the electrode cells are provided on the basis of a one-to-n (plural) correspondence.

When the electrode for the honeycomb structure forming die according to the present invention includes the holes, a central axis of each of the holes and a central axis of each of the electrode cells preferably are not positioned along the same line. Both of the hole and the electrode cell are spaces, and each of these central axes thereof is a central axis of each space that is considered to have a column-like shape. There is not any special restriction on the central axes. However, especially in a case where the holes and the electrode cells are provided on the basis of the one-to-n correspondence, the central axis of the hole and the central axis of the electrode cell preferably are not positioned along the same line.

In the electrode for the honeycomb structure forming die according to the present invention, a thickness of each of the electrode partition walls is preferably 0.01 mm or larger but smaller than 0.3 mm. The thickness of the electrode partition walls is the shortest distance between the adjacent electrode cells.

In the electrode for the honeycomb structure forming die according to the present invention, a shape of the electrode cells is preferably a hexagonal shape. In other words, such an electrode for the honeycomb structure forming die is preferably used to prepare the die for obtaining the honeycomb structure in which the flow-through cells have a hexagonal shape.

In the electrode for the honeycomb structure forming die according to the present invention, the shapes of the electrode cells are preferably an octagonal shape and a quadrangular shape. In other words, such an electrode for the honeycomb structure forming die is preferably used to prepare the die for obtaining the honeycomb structure in which the flow-through cells are octagonal shaped cells and quadrangular shaped cells. When the shapes of the electrode cells are an octagonal shape and a quadrangular shape, it is meant that a plurality of octagonal electrode cells and a plurality of quadrangular electrode cells are alternately and continuously formed.

In the description of the present specification, the shape of the electrode cells indicates the shape of the electrode cells which appears on the one surface of the thick plate-like honeycomb electrode. The electrode cell is a partitioned space, and this space can be considered to have a column-like shape. When it is described that the shape of the electrode cells is, for example, the hexagonal shape, the electrode cells form a hexagonal column-like partitioned space. This indicates that a substantive part including the electrode partition walls is formed so that the electrode cells have, for example, a hexagonal shape.

Effects of the Invention

A honeycomb electrode according to the present invention is an electrode for manufacturing a die which forms a honeycomb structure. Therefore, on at least one of two main surfaces of an electrode base body, a plurality of electrode cells partitioned by electrode partition walls should appear, and the shape of the electrode cells is required to be analogous to a shape of flow-through cells of the honeycomb structure. Moreover, a configuration formed by the electrode partition walls and the electrode cells in the honeycomb electrode is schematically similar to part or all of a configuration which appears on an end surface of the honeycomb structure or a section thereof vertical to an axial direction. In the honeycomb electrode according to the present invention, the plurality of electrode cells partitioned by the electrode partition walls appears on only one surface. In other words, the electrode cells do not have to pass through the two main surfaces of the honeycomb electrode (the electrode base body). In the other surface on which any electrode cell does not appear, any opening does not have to be provided, or holes, e.g., round holes connected to the electrode cells may be open. However, in the electrode for the honeycomb structure forming die according to the present invention, the electrode cells do not pass through the two main surfaces.

The strength of the honeycomb electrode having such a configuration according to the present invention becomes higher as compared with the honeycomb electrode through which the electrode cells pass. That is, in the honeycomb electrode according to the present invention, needless to say, thin electrode partition walls are not formed in the surface on which any electrode cell does not appear, so that the strength is high. For example, about a half or more of a volume of the electrode base body can contribute to the enhancement of the strength. The strength of the electrode becomes high as a whole. Therefore, the electrode partition walls which is formed on a side on which the electrode cells appear, while maintaining a desirable shape, can be made thinner (finer) as compared with an individually independent combtooth-like electrode.

The electrode for the honeycomb structure forming die according to the present invention is suitable as an electrode for use in obtaining a die including narrower or finer slits for obtaining a honeycomb structure including thinner porous partition walls. As a thickness of each of the electrode partition walls in the electrode for the honeycomb structure forming die according to the present invention, 0.01 mm is realized. In a conventional combtooth-like electrode (see Patent Document 2), a limit of a thickness of each usable flat plate-like projection, i.e., the rib has been 0.03 mm. When widths of slits of dies processed by using the electrodes are compared, the width of each slit of the die processed by the electrode for the honeycomb structure forming die according to the present invention can be 0.03 mm. On the other hand, a limit of the slit width of the die processed by using the conventional comb-tooth-like electrode (see Patent Document 2) has been 0.05 mm. The slit width of the die is the shortest distance between die substantive parts adjacent via the slit in the die base body.

For example, in the electrode for the honeycomb structure forming die according to the present invention, a thickness of each of the electrode partition walls is 0.15 mm. When this electrode is attached to a die sinking electric discharge machine with a voltage of 5 to 300 V and a current of 0.1 to 30 A to perform electric discharge machining, fluctuations of the slit width of the obtained die fall in 0.20±0.01 mm. On the other hand, when an electrode partition wall thickness of the conventional combtooth-like electrode (see Patent Document 2) is similarly set to 0.15 mm to perform the electric discharge machining, the fluctuations of the slit width of the obtained die become 0.20±0.05 mm. That is, according to the electrode for the honeycomb structure forming die of the present invention, a fluctuation amount of the die slit width is generally about ⅕ of that in the conventional electrode. This difference can be evaluated as it is, as a difference in deformation amount of the electrode. That is, the electrode for the honeycomb structure forming die according to the present invention is not easily deformed during use during the manufacturing of the die. Therefore, according to the electrode for the honeycomb structure forming die of the present invention, it is possible to obtain a die having only a small dimensional error and generally having a shape as designed, and it is also possible to obtain a honeycomb structure having only a small dimensional error and generally having a shape as designed.

When the electrode for the honeycomb structure forming die according to the present invention is used, the breakage or deformation of the electrode does not easily occur during the preparation of the die. Furthermore, the deformation of the die as a manufacturing or processing object does not easily occur. Additionally, the deformation of the honeycomb structure formed by the die does not easily occur. It is to be noted that the deformation mentioned herein means a shift from a design value. If the deformation of the electrode occurs during the preparation of the die, the manufactured or processed die is also deformed, e.g., distorted, the shape is not obtained as designed. It is feared that the deformation or the distortion is transferred to the honeycomb structure and that the resultant honeycomb structure is a defective product, which does not have any designed shape is formed. This causes the deterioration of yield in the manufacturing of the honeycomb structure. According to the electrode for the honeycomb structure forming die of the present invention, such problems can be avoided.

In the electrode for the honeycomb structure forming die of the present invention, a plurality of electrode cells partitioned by electrode partition walls appear only on one of two main surfaces of an electrode base body as described above. Therefore, generally about a half or more of a volume of the electrode base body does not have to be processed so that the plurality of electrode cells partitioned by the electrode partition walls appears. Therefore, the electrode does not easily break or is not easily deformed during the manufacturing of the electrode itself. That is, the electrode for the honeycomb structure forming die according to the present invention is easily prepared.

In a preferable configuration of the electrode for the honeycomb structure forming die according to the present invention, bottom portions of the electrode cells provided only in the one surface of the electrode base body further include holes formed directed to the other surface of the two main surfaces of the electrode base body. Therefore, even if these holes are not open in the other surface, a space or the volume to store a gas generated during the electric discharge machining becomes large. Therefore, a processing defect relatively does not easily occur as compared with a configuration which does not include such holes.

In a preferable configuration of the electrode for the honeycomb structure forming die according to the present invention, the holes formed directed to the other surface in the bottom portions of the electrode cells are open in the other surface, and hence during the electric discharge machining of the die, sludge and the gas generated by the electric discharge machining can be discharged by allowing a processing liquid or the like to flow through the holes. Moreover, it is possible to suck the sludge through the holes. Therefore, any processing defect does not easily occur. When the holes formed directed to the other surface in the bottom portions of the electrode cells are not open in the other surface, the sludge generated by the electric discharge machining passes through a space between the electrode for the honeycomb structure forming die which is subjected to the electric discharge machining and the die base body as the processing object during the electric discharge machining of the die. In this case, the electric discharge becomes unstable, and the processing defect might be generated. According to this preferable configuration, such a problem can securely be avoided. It is to be noted that when the strength of the electrode is most prioritized, the holes formed directed to the other surface in the bottom portions of the electrode cells preferably are not present. Moreover, even when the holes are present, the holes preferably are not open in the other surface.

BRIEF DESCRIPTION OF THE DRAWINGS

FIGS. 5A, 5B, 7A and 12 are drawn with a transparent base body in order to better demonstrate the shape and positioning of the electrode cells and round holes within the base body.

DETAILED DESCRIPTION OF THE INVENTION

Figure 1:
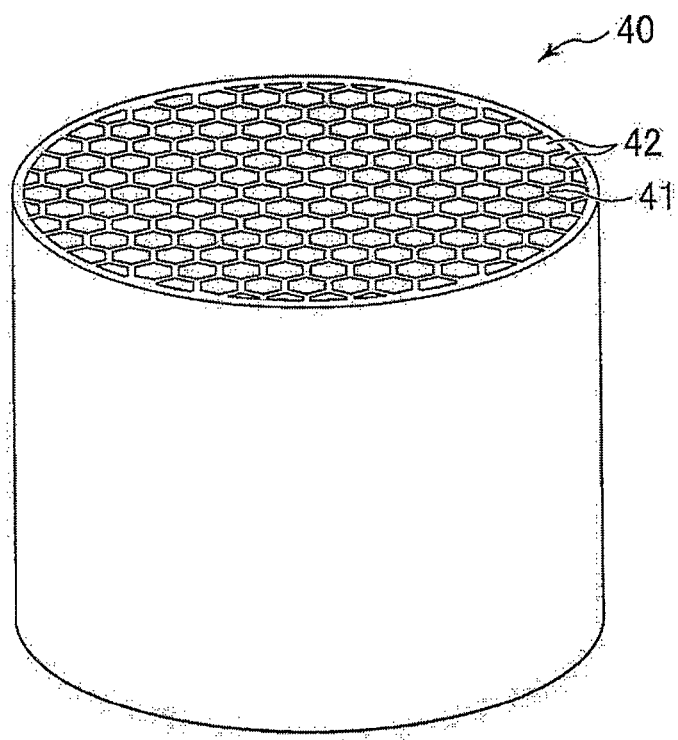
FIG. 1 is a perspective view schematically showing an example of a honeycomb structure.

Hereinafter, embodiments of the present invention will appropriately be described with reference to the drawings, but it should be understood that the present invention is not limited to the following embodiments when interpreted and that various changes, modifications and improvements can be added on the basis of the knowledge of a person skilled in the art, without departing from the scope of the present invention. For example, the drawings show preferable embodiments of the present invention, but the present invention is not limited by configurations or information shown in the drawings. When the present invention is performed or verified, means similar or equivalent to those described in the present description can be applied, but preferable means are described hereinbelow.

The drawings for use in the following description are schematic views, and in the respective drawings, the number of constituent elements, e.g., electrode cells or electrode partition walls does not necessarily match, and is smaller than the practical number thereof. This is because the respective drawings are drawn to facilitate the understanding of invention concepts and processing steps. For example, the number of the electrode cells concerned with a honeycomb electrode is 20 in FIG. 3A, FIG. 3B, FIG. 4A and FIG. 4B, twelve in FIG. 5A, FIG. 5B, FIG. 7A, FIG. 7B and FIG. 8, 22 in FIG. 6A and FIG. 11A, seven in FIG. 9, and 16 in FIG. 10. However, needless to say, it should be understood that the practical number of the electrode cells becomes a necessary number in accordance with specifications of a honeycomb structure forming die to be obtained, e.g., a die 1 shown in FIG. 2A to FIG. 2C and further specifications of a honeycomb structure (e.g., a honeycomb structure 40 shown in FIG. 1).

The present invention is an electrode for use in processing a honeycomb structure forming die, and the honeycomb structure forming die is used for forming a honeycomb structure. Therefore, the honeycomb structure and the honeycomb structure forming die will first be described before describing the electrode for the honeycomb structure forming die.

[Honeycomb Structure]

A honeycomb structure 40 illustrated in FIG. 1 is a ceramic product whose outer shape is a columnar shape having two end surfaces and a peripheral surface. The honeycomb structure 40 includes therein a plurality of flow-through cells 42 which are partitioned by ceramic porous partition walls 41 each including a large number of pores and which become through channels of a gas. In the honeycomb structure 40, a sectional shape of the flow-through cells 42 vertical to an axial direction is a hexagonal shape.

A sectional shape of the flow-through cells 42 indicates a shape which appears on an end surface shown in FIG. 1 or a shape which appears on a section vertical to a central axis of a columnar shape. The flow-through cells 42 are partitioned spaces, and this space can be considered to have a column-like shape. When it is described that the flow-through cells 42 have, for example, a hexagonal shape, the flow-through cells form an elongated hexagonal column-like space. In other words, the porous partition walls 41 as substantive parts are formed so that the flow-through cells 42 have a hexagonal shape. A main forming raw material i.e., aggregate particles of the honeycomb structure 40 is, for example, a cordierite forming raw material such as alumina, kaolin or talc, or silicon carbide.

[Honeycomb Structure Forming Die]

Figure 2A:
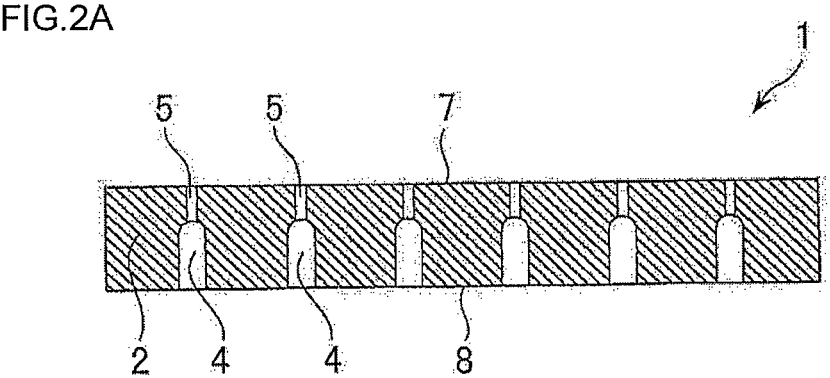
FIG. 2A is a sectional view schematically showing an example of a honeycomb structure forming die.
Figure 2B:
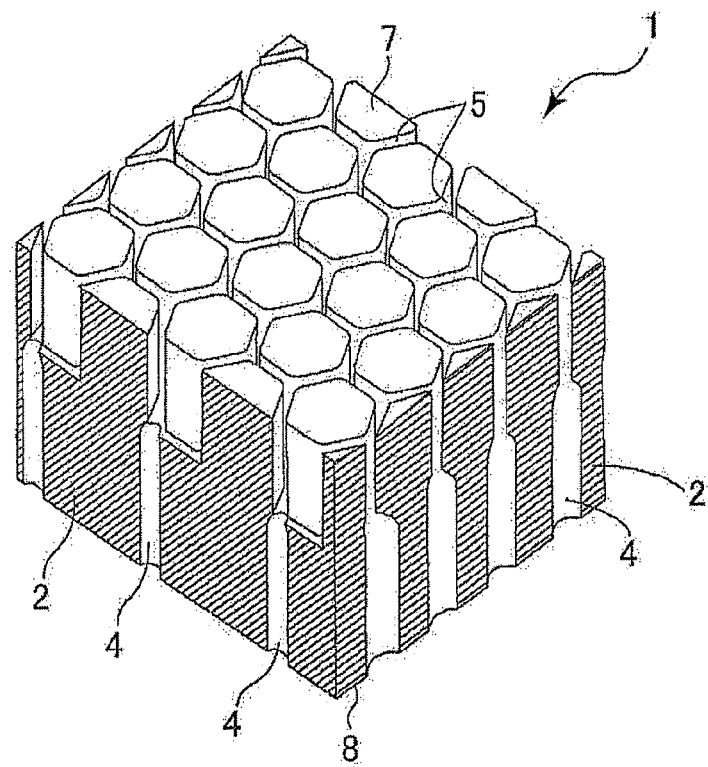
FIG. 2B is a partially enlarged perspective view schematically showing the example of the honeycomb structure forming die.
Figure 2C:
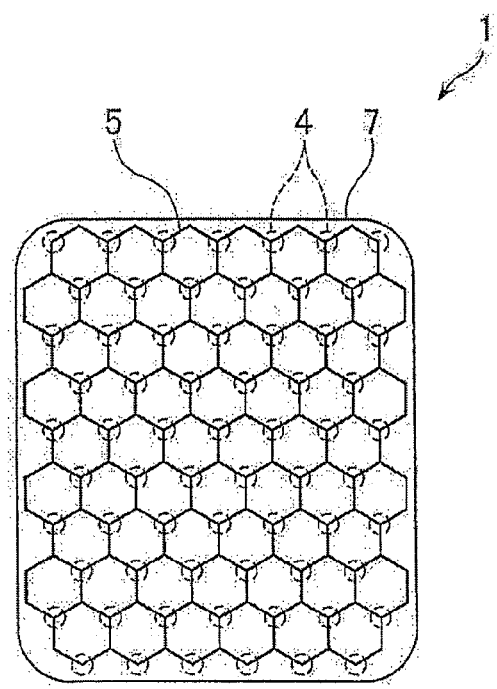
FIG. 2C is a plan view schematically showing the example of the honeycomb structure forming die.

An example of the honeycomb structure is the honeycomb structure 40 described above, and is obtained through extrusion forming by use of an extrusion forming machine including a honeycomb structure forming die. A die 1, i.e., the honeycomb structure forming die illustrated in FIG. 2A to FIG. 2C is constituted of a die base body 2 having a thick plate-like shape, or a rectangular parallelepiped shape and having one surface 7 and the other surface 8. In the other surface 8, introduction holes 4 through which a forming raw material is introduced are formed, and in the one surface 7, slits 5 which communicate with the introduction holes 4 are formed. The slits 5 have a hexagonal shape matching, for example, a shape of the flow-through cells 42 of the honeycomb structure 40, and have a width corresponding to, for example, a thickness of each of the porous partition walls 41 of the honeycomb structure 40. FIG. 2B is a view drawn as a perspective view by cutting part of the die 1 so that a section is exposed.

In the die 1, a shape shown by the slits 5 on the one surface 7 is, for example, a hexagonal shape adjusted to the shape of the porous partition walls 41 of the honeycomb structure 40. Moreover, the shape of the die base body 2 appearing as a substantive part having been defined by the slits 5 on the one surface 7 is, for example, a hexagonal shape adjusted to the sectional shape of the flow-through cells 42 of the honeycomb structure 40. Furthermore, a width of each of the slits 5 corresponds to the thickness of each of the porous partition walls 41 of the honeycomb structure 40. In consequence, a shape of the die 1 is a complementary shape to the end surface shape or the sectional shape of the honeycomb structure 40. The introduction holes 4 have a diameter larger than the width of each of the slits 5, and the introduction holes 4 are provided at positions where the slits 5 intersect. The die base body 2 as a material constituting the die 1 is a metal or an alloy, and examples of the material include metals such as iron (Fe), titanium (Ti), nickel (Ni), copper (Cu) and aluminum (Al), an alloy containing these metals, for example, a stainless steel alloy such as SUS630, and tungsten carbide based cemented carbide.

[Electrode for Honeycomb Structure Forming Die]

Moreover, an example of the die is the die 1 described above, and is obtained by forming introduction holes and slits in a die base body in which any introduction hole or slit is not formed. At this time, an electrode for the honeycomb structure forming die, or honeycomb electrode is used for forming, for example, hexagonal slits in the die base body in which any introduction hole or slit is not formed.

Figure 3A:
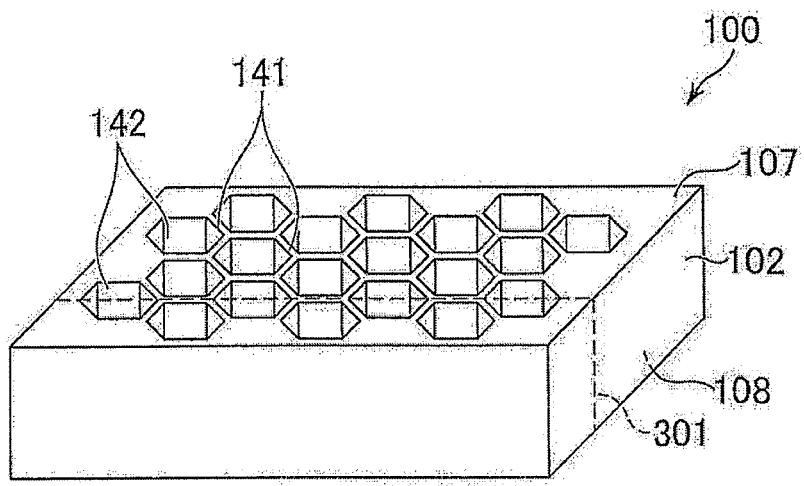
FIG. 3A is a perspective view schematically showing an embodiment of an electrode for a honeycomb structure forming die according to the present invention.
Figure 3B:
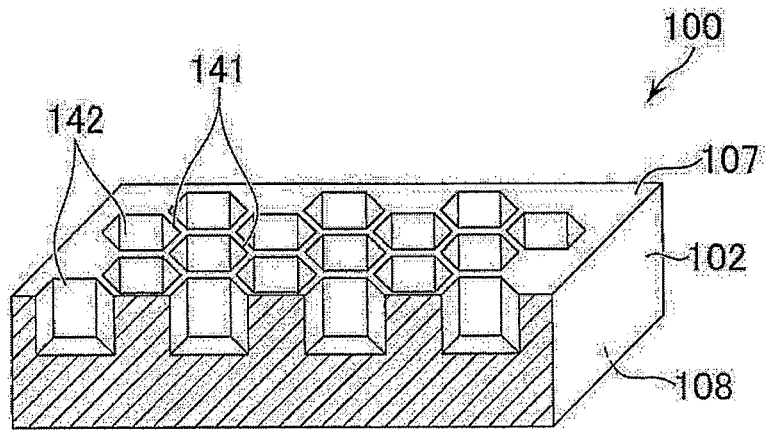
FIG. 3B is a perspective view showing a section of the electrode for the honeycomb structure forming die shown in FIG. 3A.

A honeycomb electrode 100 shown in FIG. 3A and FIG. 3B (the electrode for the honeycomb structure forming die according to the present invention) is made of an electricity discharging material, and includes a thick plate-like or rectangular parallelepiped electrode base body 102 having two main surfaces, i.e., one surface 107 and the other surface 108. FIG. 3B shows a section cut along a cutting line 301 in FIG. 3A. Only in the one surface 107 side of the electrode base body 102, a plurality of electrode cells 142 partitioned by electrode partition walls 141 are disposed as an open portion, and in the other surface 108 side, the electrode cells 142 are not disposed remained without being opened. When the one surface 107 of the honeycomb electrode 100 is seen, it can be confirmed as shown in FIG. 3A that the electrode cells 142 are analogous to, for example, flow-through cells of the honeycomb structure 40 and that a shape corresponding to an end surface shape of the honeycomb structure 40 appears (see FIG. 1). The sectional shape of the surface thereof vertical to an axial direction is also the same. In the honeycomb electrode 100, only portions that partition the plurality of electrode cells 142; in other words, only portions between an electrode cell 142 and an electrode cell 142 are constituted of the electrode partition walls 141. In one of the electrode cells 142, a portion of the cell which is not adjacent to the other electrode cell 142 does not become the electrode partition wall 141, and is the electrode base body 102 itself. On this outer peripheral side, an unprocessed portion of the electrode base body is referred to a fringe portion sometimes in the present description.

In the honeycomb electrode 100, the other surface 108 on which the electrode partition walls 141 and the electrode cells 142 do not appear is not provided with the thin electrode partition walls 141, and a portion which occupies generally about a half of a volume is constituted of a substantive part of the electrode base body 102. Therefore, the honeycomb electrode 100 has a high strength as a whole. Therefore, the electrode partition walls 141 which form the electrode cells 142 are thin, but are not easily deformed. The electrode partition walls 141 of the honeycomb electrode 100 have a thickness of 0.01 mm or larger but smaller than 0.3 mm. Even when the electrode partition walls are thin in this manner, the honeycomb electrode 100 including the electrode partition walls 141 do not break or is not deformed during the processing (manufacturing) of the die. It is to be noted that the thickness of each of the electrode partition walls 141 is the shortest distance between the adjacent electrode cells 142.

Figure 4A:
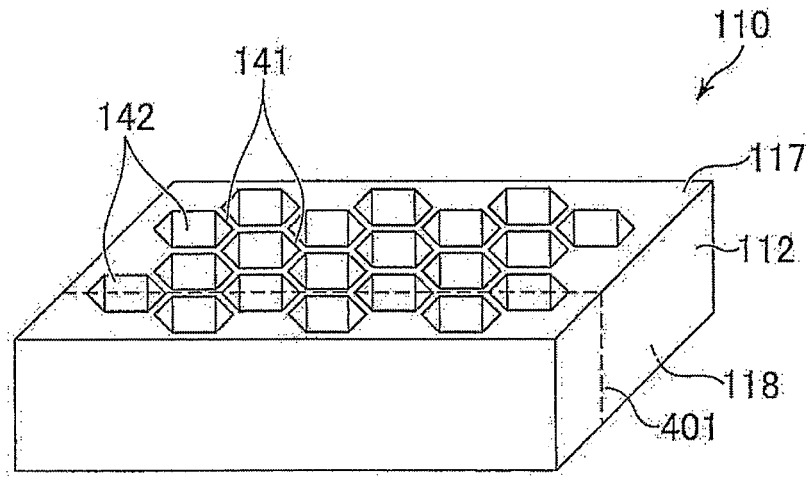
FIG. 4A is a perspective view schematically showing another embodiment of the electrode for the honeycomb structure forming die according to the present invention.
Figure 4B:
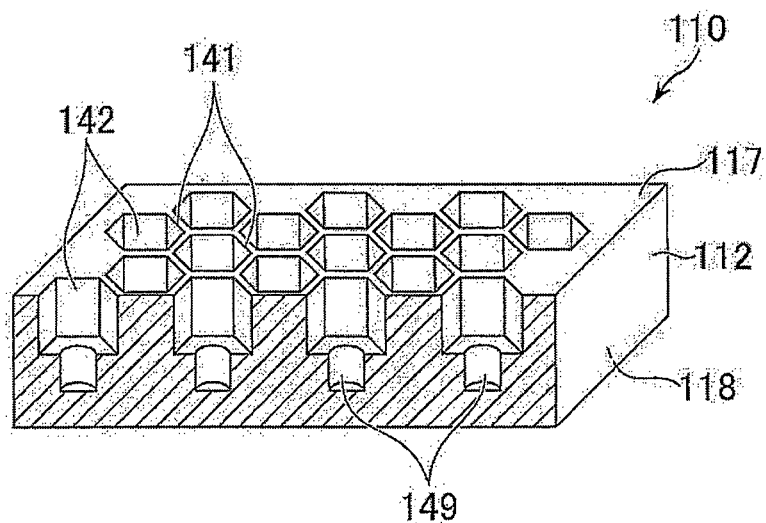
FIG. 4B is a perspective view showing a section of the electrode for the honeycomb structure forming die shown in FIG. 4A.

A honeycomb electrode 110 according to the present invention shown in FIG. 4A and FIG. 4B is made of an electricity discharging material, and includes a thick plate-like or rectangular parallelepiped electrode base body 112 having two main surfaces of one surface 117 and the other surface 118. FIG. 4B shows a section cut along a cutting line 401 of FIG. 4A. In the honeycomb electrode 110, a plurality of electrode cells 142 partitioned by electrode partition walls 141 are disposed as an open hole only in the one surface 117 of the electrode base body 112, and the electrode cells 142 are not disposed; i.e., the cells are not open in the other surface 118 in the same manner as in the honeycomb electrode 100. However, the honeycomb electrode 110 further includes round holes 149 formed directed to the other surface 118 of the electrode base body 112 in the bottom portions of the electrode cells 142 provided only in the one surface 117 of the electrode base body 112. The round holes 149 can be referred to as pores made in the bottom portions of the electrode cells 142 as seen from the one surface 117, and are not open in the other surface 118. When the one surface 117 of the honeycomb electrode 110 is seen in the same manner as in the honeycomb electrode 100, as shown in FIG. 4A, the electrode cells 142 are analogous to, for example, the flow-through cells of the honeycomb structure 40, and a shape corresponding to the end surface shape of the honeycomb structure 40 appears (see FIG. 1). The sectional shape of the surface vertical to an axial direction is the same. The honeycomb electrode 110 includes a fringe portion in the same manner as in the honeycomb electrode 100.

In the honeycomb electrode 110, the other surface 118 on which the electrode partition walls 141 and the electrode cells 142 do not appear is not provided with the thin electrode partition walls 141, and in a portion which occupies generally about a half of a volume, the bottom portions of the electrode cells 142 are simply provided with the round holes 149, respectively. The plurality of round holes 149 are not open in the other surface 118, and any thin wall is not disposed between the holes, whereby the honeycomb electrode 110 has a high strength as a whole. Therefore, the electrode partition walls 141 are thin, but are not easily deformed. The electrode partition walls 141 of the honeycomb electrode 110 have a thickness of 0.01 mm or larger but smaller than 0.3 mm in the same manner as in the honeycomb electrode 100. Even when the electrode partition walls are thin in this manner, the honeycomb electrode 110 including the electrode partition walls 141 does not break or is not deformed during the processing or manufacturing of the die.

Figure 5A:
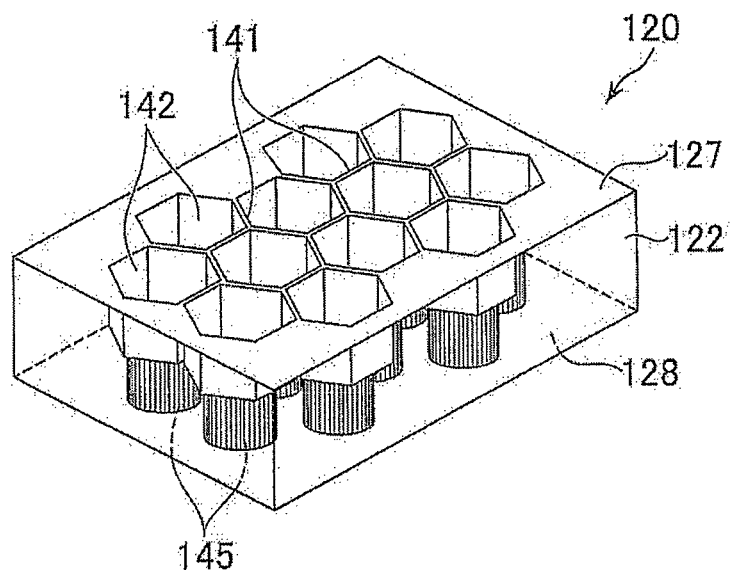
FIG. 5A is a perspective view schematically showing still another embodiment of the electrode for the honeycomb structure forming die according to the present invention, as seen through the inside of the electrode from one surface side.
Figure 5B:
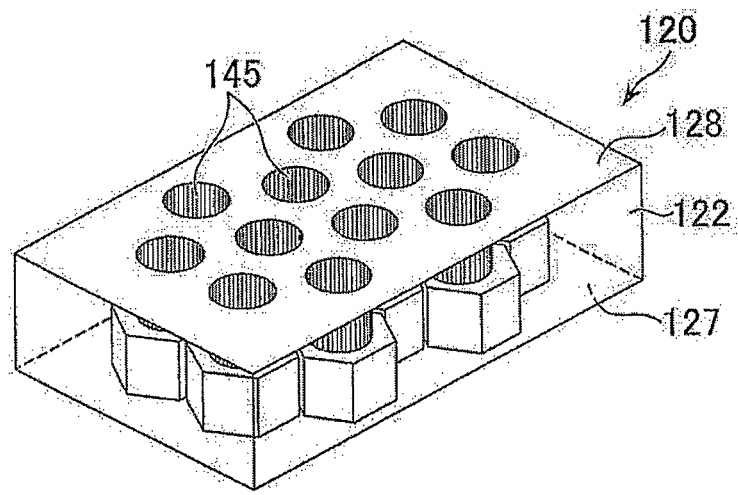
FIG. 5B is a perspective view of the electrode for the honeycomb structure forming die shown in FIG. 5A as seen through the inside of the electrode from the other surface side.

A honeycomb electrode 120 according to the present invention shown in FIG. 5A and FIG. 5B is made of an electricity discharging material, and includes a thick plate-like, or rectangular parallelepiped electrode base body 122 having two main surfaces of one surface 127 and the other surface 128. Further in the honeycomb electrode 120, a plurality of electrode cells 142 partitioned by electrode partition walls 141 are disposed as an open portion only in the one surface 127 of the electrode base body 122, and the electrode cells 142 are not disposed (the cells are not open) in the other surface 128 in the same manner as in the honeycomb electrodes 100 and 110. However, the honeycomb electrode 120 further includes round holes 145 formed directed to the other surface 128 of the electrode base body 122 in the bottom portions of the electrode cells 142 provided only in the one surface 127 of the electrode base body 122. Unlike the honeycomb electrode 110, the round holes 145 are open in the other surface 128. Therefore, in the electrode base body 122 of the honeycomb electrode 120, the one surface 127 communicates with the other surface 128 by the electrode cells 142 and the round holes 145. When a shape of the openings in the honeycomb electrode 120 is seen, a shape which appears on the one surface 127 of the two main surfaces is different from a shape which appears on the other surface 128. When the one surface 127 of the honeycomb electrode 120 is seen, it is seen that as shown in FIG. 5A, the electrode cells 142 are analogous to flow-through cells of a honeycomb structure 40, and part of a shape schematically similar to an end surface shape of the honeycomb structure 40 appears on the one surface 127. The honeycomb electrode 120 includes a fringe portion in the same manner as in the honeycomb electrodes 100 and 110. In the honeycomb electrode 120, only portions that partition the plurality of electrode cells 142; in other words, only each portion between the electrode cell 142 and the electrode cell 142, are constituted of the electrode partition walls 141. In the one electrode cell 142, a portion which is not adjacent to the other electrode cell 142 does not become the electrode partition wall 141, and is the electrode base body 122 itself.

In the honeycomb electrode 120, the other surface 128 on which the electrode partition walls 141 and the electrode cells 142 do not appear is not provided with the thin electrode partition walls 141, and in a portion which occupies generally about a half of a volume, the round holes 145 are simply formed. The plurality of round holes 145 are open in the other surface 128, and any thin wall is not disposed between the round holes 145, whereby the honeycomb electrode 120 has a high strength as a whole. Therefore, the electrode partition walls 141 are thin, but are not easily deformed. The electrode partition walls 141 of the honeycomb electrode 120 have a thickness of 0.01 mm or larger but smaller than 0.3 mm in the same manner as in the honeycomb electrodes 100 and 110. Even when the electrode partition walls are thin in this manner, the honeycomb electrode 120 including the electrode partition walls 141 does not break or is not deformed during the processing (manufacturing) of the die.

Figure 12:
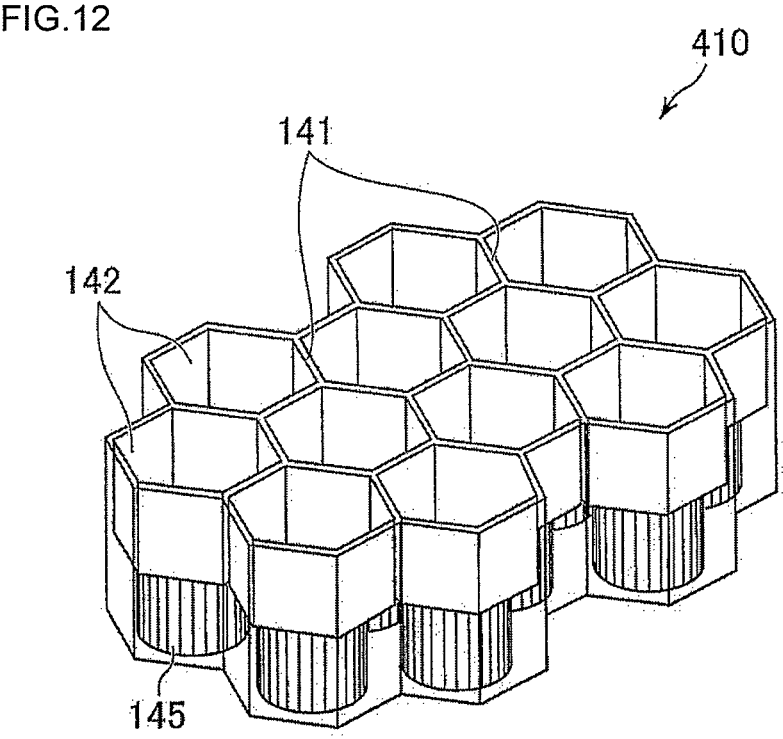
FIG. 12 is a perspective view schematically showing a further embodiment of the electrode for the honeycomb structure forming die according to the present invention, as seen through the inside of the electrode.

In a honeycomb electrode 410 (the electrode for the honeycomb structure forming die) shown in FIG. 12, a plurality of electrode cells 142 appear only on one surface in the same manner as in the honeycomb electrode 120. However, the honeycomb electrode 410 does not include any fringe portion. In a portion which occupies generally about a half of a volume where the electrode cells 142 are formed in the honeycomb electrode 410, i.e., the upper side in FIG. 12, not only portions that partition the plurality of electrode cells 142 but also portions where the one electrode cell 142 is not adjacent to the other electrode cell 142 are constituted of electrode partition walls 141. In other words, in the portion which occupies generally about the half of the volume, the honeycomb electrode 410 is constituted only of the electrode partition walls 141 which partition the plurality of electrode cells 142, and another portion corresponding to the electrode base body is not present in the honeycomb electrode 410. However, in the honeycomb electrode 410, the thin electrode partition walls 141 are not formed in the other surface side which the electrode cells 142 do not appear, in the same manner as in the honeycomb electrode 120. The portion which occupies generally about the half of the volume, i.e., the bottom side in FIG. 12 is only provided with a plurality of round holes 145, and hence the honeycomb electrode 410 has a high strength as a whole.

Figure 6A:
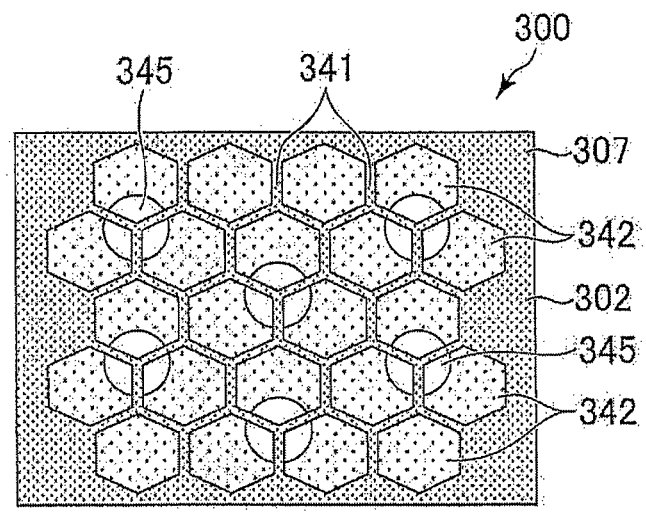
FIG. 6A is a plan view (the top plan view) of one surface schematically showing a further embodiment of the electrode for the honeycomb structure forming die according to the present invention.
Figure 6B:
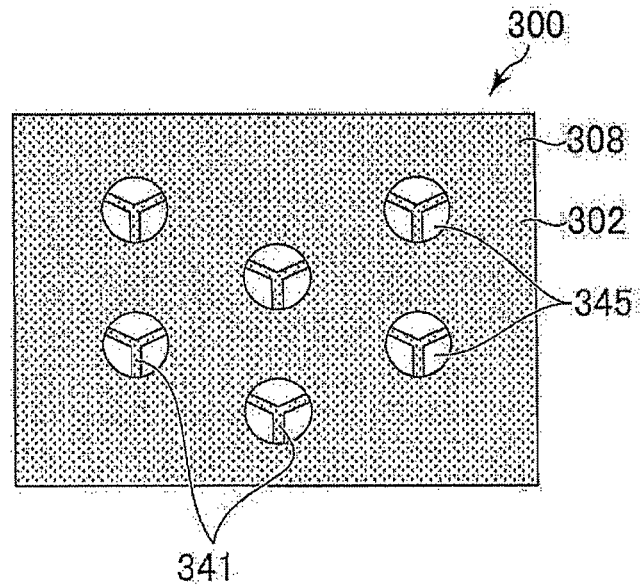
FIG. 6B is a plan view (the back surface view) schematically showing the other surface of the electrode for the honeycomb structure forming die shown in FIG. 6A.

A honeycomb electrode 300 according to the present invention) shown in FIG. 6A and FIG. 6B is made of an electricity discharging material, and includes a thick plate-like, or rectangular parallelepiped electrode base body 302 having two main surfaces of one surface 307 and the other surface 308. Further in the honeycomb electrode 300, a plurality of electrode cells 342 partitioned by electrode partition walls 341 are disposed as an open portion) only in the one surface 307 of the electrode base body 302, and the electrode cells 342 are not disposed; i.e., the cells are not open in the other surface 308. However, the honeycomb electrode 300 further includes round holes 345 formed directed to the other surface 308 of the electrode base body 302 in bottom portions of the electrode cells 342 provided only in the one surface 307 of the electrode base body 302. The round holes 345 are open in the other surface 308. Therefore, in the electrode base body 302 of the honeycomb electrode 300, the one surface 307 communicates with the other surface 308 by the electrode cells 342 and the round holes 345. When a shape of openings in the honeycomb electrode 300 is seen, a shape which appears on the one surface 307 of the two main surfaces is different from a shape which appears on the other surface 308. When the one surface 307 of the honeycomb electrode 300 is seen, it is seen that as shown in FIG. 6A, the electrode cells 342 are analogous to flow-through cells of a honeycomb structure 40, and part of a shape schematically similar to an end surface shape of the honeycomb structure 40 appears on the one surface 307. The honeycomb electrode 300 includes a fringe portion in the same manner as in the honeycomb electrodes 100, 110 and 120.

In the honeycomb electrode 110, the round holes 149 and the electrode cells 142 are provided on the basis of a one-to-one correspondence, and similarly in the honeycomb electrode 120, the round holes 145 and the electrode cells 142 are provided on the basis of the one-to-one correspondence. On the other hand, in the honeycomb electrode 300, each of the round holes 345 is provided for three electrode cells 342. The round holes 345 are not provided on the basis of the one-to-one correspondence with the electrode cells 342. Moreover, a central axis of each of the round holes 345 is positioned to be superimposed on an intersection of the electrode partition walls 341 which form the three electrode cells 342, and the central axis of the round hole 345 and a central axis of each of the electrode cells 342 are not positioned along the same line. In other words, when the electrode cells 342 and the round holes 345 which are spaces are considered to have a column-like shape, the central axes thereof are not the same axis. The honeycomb electrode 300 is different from the honeycomb electrodes 110 and 120 in this respect.

In the honeycomb electrode 300, in the same manner as in the honeycomb electrode 120, the thin electrode partition walls 341 are not formed in the other surface 308 on which the electrode partition walls 341 and the electrode cells 342 do not appear, and a plurality of round holes 345 are only formed in the portion which occupies generally about the half of the volume. The plurality of round holes 345 are open in the other surface 308, but a portion between the round holes 345 is not a thin wall, whereby the honeycomb electrode 300 has a high strength as a whole. Therefore, the electrode partition walls 341 are thin, but are not easily deformed. In the same manner as in the honeycomb electrodes 100, 110 and 120, the electrode partition walls 341 of the honeycomb electrode 300 has a thickness of 0.01 mm or larger but smaller than 0.3 mm. Even when the walls are thin; the honeycomb electrode 300 including the electrode partition walls 341 does not break or is not deformed during the processing (manufacturing) of the die.

As the electricity discharging material for use as the electrode base bodies 102, 112, 122 and 302, for example, a copper tungsten alloy, a silver tungsten alloy, copper, carbon graphite or the like can be used. More specifically, the copper tungsten alloy containing Cu at 50 mass % and W at 50 mass % has advantages that boring with a drill or the like is enabled, that conductivity and melting point are high, and hence excels in corrosion resistance and wear resistance, and that electricity discharge characteristics are satisfactory and processing accuracy is high.

Next, there will be described a manufacturing method of the honeycomb electrode according to the present invention, a method of manufacturing the honeycomb structure forming die and a method of manufacturing the honeycomb structure.

[Manufacturing Method of Electrode for Honeycomb Structure Forming Die]

As to the manufacturing method of the honeycomb electrode according to the present invention, first, the manufacturing of the honeycomb electrode 120 shown in FIG. 5A and FIG. 5B will be described as an example with reference to FIG. 7A, FIG. 7B, FIG. 8 and FIG. 9.

First, there is prepared a thick plate-like electrode base body which is made of an electricity discharging material and has two main surfaces and in which any hole is not processed. This electrode base body is processed to become the electrode base body 122 later, and can be obtained by cutting a commercially available plate-like material into a desirable size.

Figure 7A:
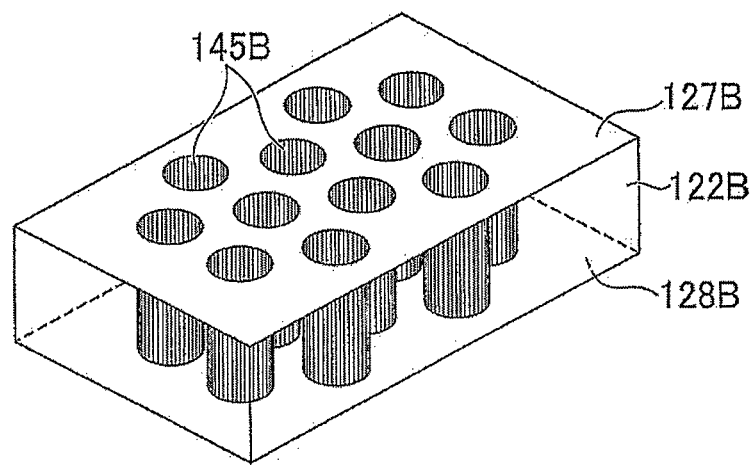
FIG. 7A is a perspective view schematically showing an embodiment of a manufacturing method of the electrode for the honeycomb structure forming die according to the present invention, and showing a state that a plurality of round holes are made in an electrode base body as seen through the inside of the electrode base body.
Figure 7B:
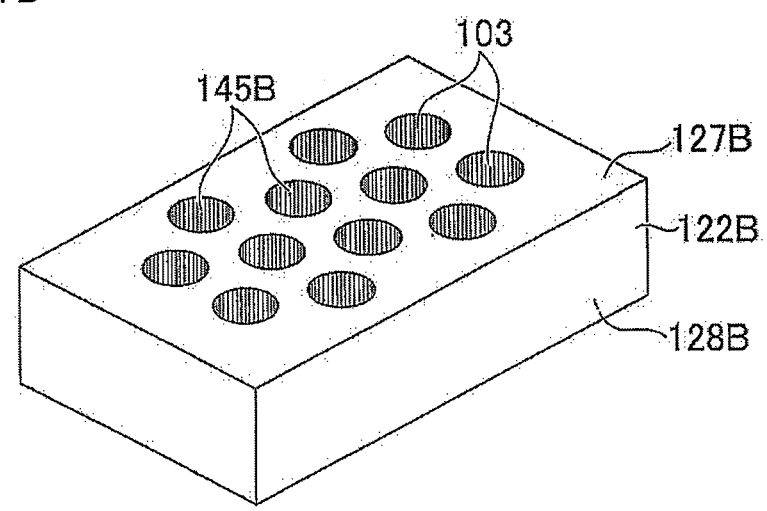
FIG. 7B is a perspective view showing the electrode base body in which the plurality of round holes are made as shown in FIG. 7A, and is not a seen-through view.
Figure 9:
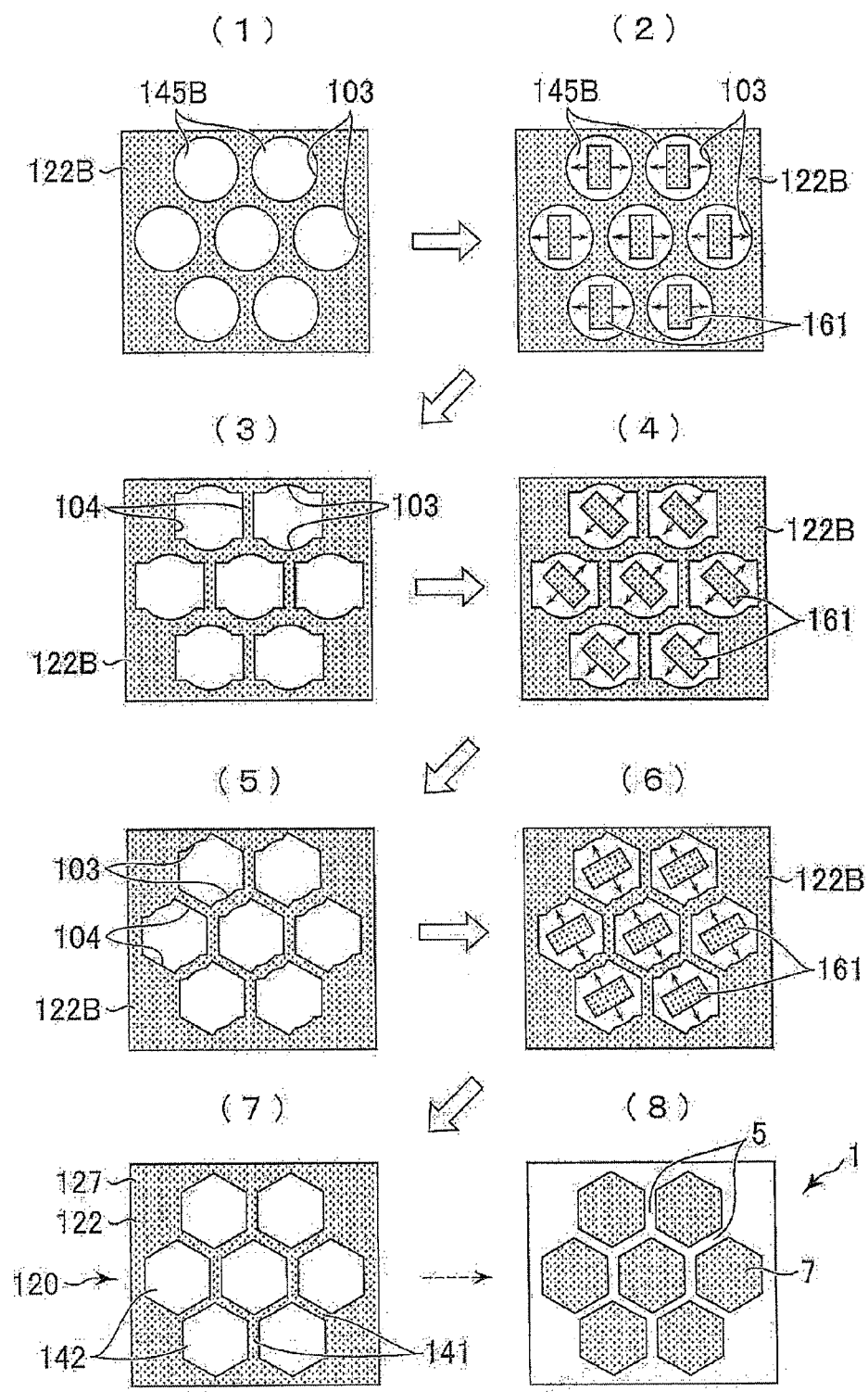
FIG. 9 is a plan view schematically showing another embodiment of the manufacturing method of the electrode for the honeycomb structure forming die according to the present invention, and showing steps in order.

Next, in the electrode base body, a plurality of round holes 145B which pass through one surface 127B and the other surface 128B are made, to obtain an electrode base body 122B (see FIG. 7A, FIG. 7B and (1) of FIG. 9). The round holes 145B can be made by subjecting the electrode base body 122B to, for example, boring with a drill. It is to be noted that FIG. 7A shows a state when seeing through the inside of the electrode base body, and in FIG. 7B, the inside thereof is not seen through. FIG. 5A and FIG. 5B described above apparently conform to the configuration shown in FIG. 7B (when not seen through).

In the electrode base body 122B, the plurality of round holes 145B are made at positions corresponding to, for example, the flow-through cells 42 of the honeycomb structure 40 (see FIG. 1). That is, positions to be provided with the plurality of round holes 145B are based on design, e.g., a flow-through cell size, a flow-through cell pitch, etc. of the honeycomb structure to be finally obtained. The round holes mean holes each having a round shape which appears on the main surface of the electrode base body. This round hole can be considered to have a columnar shape. In this case, a space between center axes of the round holes 145B can be from about 0.80 to 2.50 mm. Moreover, a radius of a circle which is vertical to the center axis can be from about 0.40 to 1.20 mm.

Figure 8:
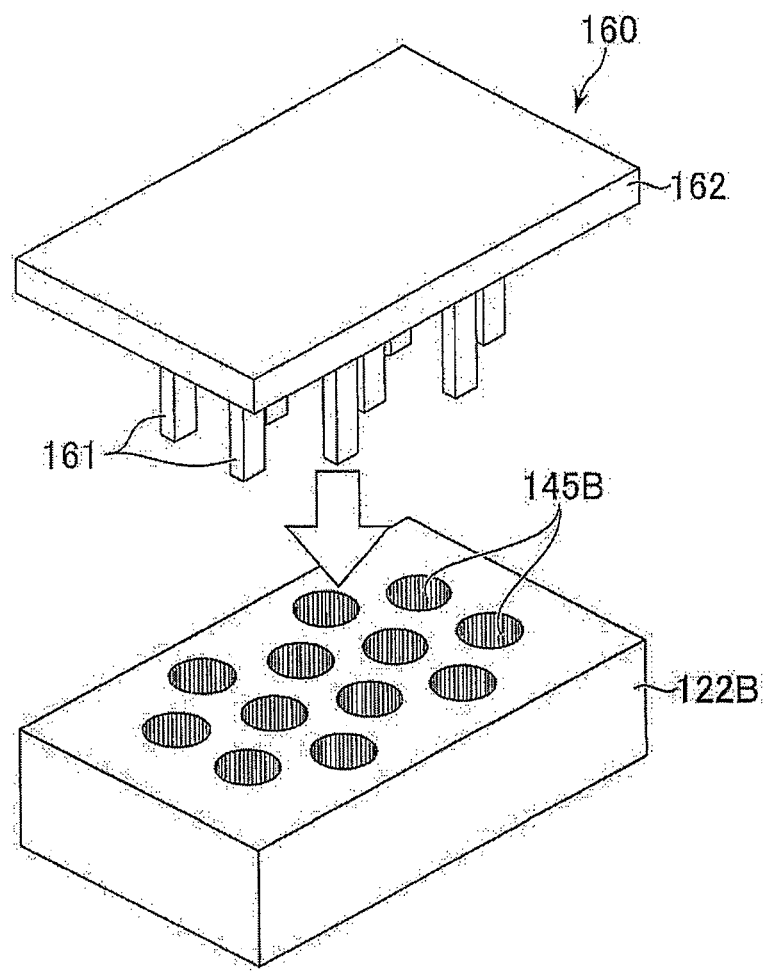
FIG. 8 is a perspective view schematically showing the embodiment of the manufacturing method of the electrode for the honeycomb structure forming die according to the present invention, and showing a state that processing electrodes are to be inserted into a plurality of round holes.

Next, each of processing electrodes 161 preferably made of carbon graphite is inserted into about a half of a depth of each of the round holes 145B, e.g., from about 1 to 10 mm (see FIG. 8). For example, each of the processing electrodes 161 has a prism shape, and the plurality of processing electrodes 161 are integrated through a support portion 162, to become a combtooth-like electrode (a combtooth-like electrode 160) as a whole. Then, the inserted processing electrodes discharge electricity from the insides of the round holes 145B toward hole side surfaces 103 of the electrode base body 122B, to process the hole side surfaces 103 of the electrode base body 122B (see (2) of FIG. 9). In electric discharge machining of the hole side surfaces 103, generally about a half of each of the round holes 145B in a depth direction is changed to the hexagonal electrode cell 142 (see FIG. 5A). During this electric discharge machining, the processing electrodes 161 are preferably moved in parallel along a direction shown by arrows in FIG. 9(2). This also applies to (4) and (6) of FIG. 9. By this parallel movement, the processing electrodes 161 come close to the opposing hole side surfaces 103, to process the surfaces into flat surfaces, respectively. After this first electric discharge machining, opposing portions of the hole side surfaces 103 become flat surfaces 104 (see (3) of FIG. 9).

Afterward, an angle is changed as much as, for example, 60° in a left rotating direction from the state of FIG. 9(2), to similarly insert the processing electrodes 161, and the electricity is discharged toward the hole side surfaces 103 of the electrode base body 122B to process the surfaces (see (4) of FIG. 9). The angle is further changed as much as 60° in the left rotating direction (120° (or −60° in the left rotating direction from the first position), to similarly insert the processing electrodes 161. When the electricity is discharged toward the hole side surfaces 103 of the electrode base body 122B to process the surfaces (see (6) of FIG. 9), the hole side surfaces 103 change to the flat surfaces 104 every time (see (5) and (7) of FIG. 9). Finally, generally about the half of each of the round holes 145B in the depth direction (specifically from about 1 to 10 mm) becomes the hexagonal electrode cell 142, to obtain the honeycomb electrode 120 (see (7) of FIG. 9, and FIG. 5A). It is to be noted that the remaining portion of each of the round holes 145B in the depth direction becomes the round hole 145 as it is (see FIG. 5B). However, FIG. 9 does not show a portion which becomes the round hole 145 as it is (the portion is omitted).

The processing can be performed by changing the angle while using the same combtooth-like electrode 160, depending on an arrangement of the plurality of round holes 145B and additionally, the flow-through cell size, the flow-through cell pitch and the like of the honeycomb structure. However, another combtooth-like electrode may be required in some case.

It is to be noted that as described above, each drawing is a schematic view, and FIG. 9 shows only seven electrode cells to facilitate the understanding of the steps, unlike FIG. 5A, FIG. 5B and FIG. 8. FIG. 5A, FIG. 5B and FIG. 8 show 12 electrode cells. Any number is not necessarily a practically appropriate number. A honeycomb electrode including a fringe portion as in the honeycomb electrode 120 is used to prepare the honeycomb structure forming die as a full-size honeycomb electrode at a time, and hence the number of the electrode cells is actually determined on the basis of specifications of the honeycomb structure forming die to be obtained further on the basis of specifications of the honeycomb structure. On the other hand, in a honeycomb electrode which does not include any fringe portion as in the honeycomb electrode 410, the number of the electrode cells is determined on the basis of the specifications of the honeycomb structure forming die to be obtained further based on the specifications of the honeycomb structure, but the number of the electrode cells may be small. This is because this type of the honeycomb structure forming die can be prepared by using in plural times a honeycomb electrode which does not include any fringe portion, i.e., the partial-size honeycomb electrode.

Figure 11A:
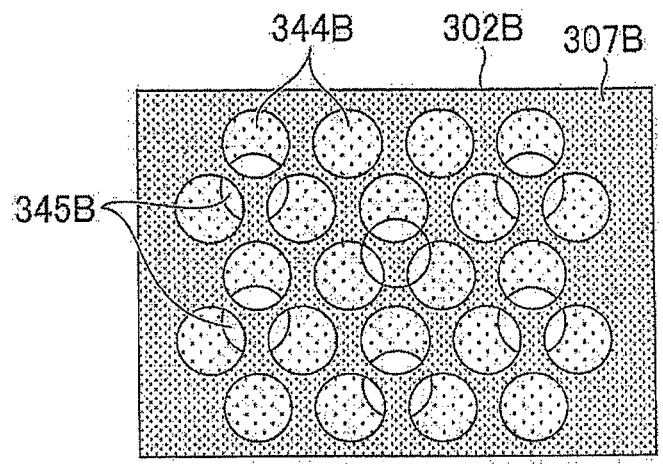
FIG. 11A is a plan view (the top plan view) of one surface schematically showing a further embodiment of the manufacturing method of the electrode for the honeycomb structure forming die according to the present invention.
Figure 11B:
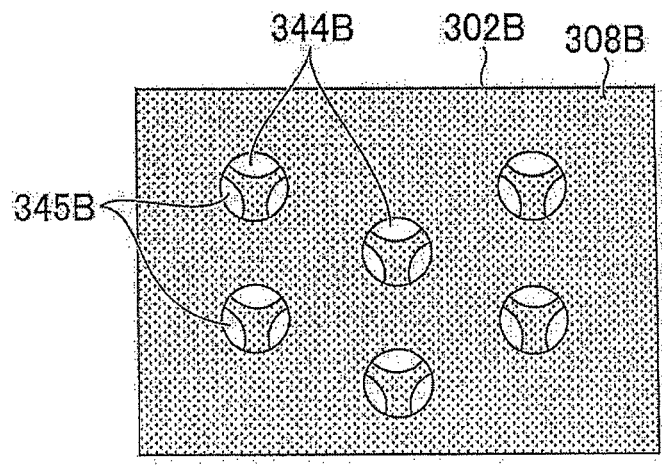
FIG. 11B is a plan view (the back surface view) schematically showing the other surface of the electrode for the honeycomb structure forming die shown in FIG. 11A.

Next, the manufacturing of the honeycomb electrode 300 shown in FIGS. 6A and 6B will be described as an example with reference to FIG. 11A and FIG. 11B.

First, there is prepared a thick plate-like electrode base body made of an electricity discharging material and having two main surfaces in the same manner as in the honeycomb electrode 120. This electrode base body becomes the electrode base body 302 later, and can be obtained by cutting a commercially available plate-like material into a desirable size.

Next, in the electrode base body, a plurality of round holes 344B which do not pass therethrough are open with generally about a half of a depth from the one surface 307B, specifically from about 1 to 10 mm, from one surface 307B side toward the other surface 308B. Then, conversely a plurality of round holes 345B which do not pass through the electrode base body are open with generally about a half of a depth from the other surface 308B, specifically from about 1 to 10 mm from the other surface 308B side toward the one surface 307B. In this manner, there is obtained an electrode base body 302B through which three round holes 344B and one round hole 345B pass (see FIG. 11A and FIG. 11B). At this time, when a central axis of the round hole 345B is superimposed on the center of a triangle shape which connects central axes of the three round holes 344B, each of the round holes 344B communicates with the round hole 345B with the same opening area. The round holes 344B and 345B can be opened by, for example, boring with a drill. In the electrode base body 302B, the plurality of round holes 344B are open at positions corresponding to, for example the flow-through cells 42 of the honeycomb structure 40 in the same manner as in the honeycomb electrode 120. That is, the positions where the plurality of round holes 344B are to be provided are determined on the basis of the design of the honeycomb structure to be finally obtained, which may include a flow-through cell size, a flow-through cell pitch or the like.

Then, the processing electrodes 161 may be inserted into the plurality of round holes 344B to perform electric discharge machining, and the round holes 344B may be processed into the hexagonal electrode cells 342 in the same manner as in the honeycomb electrode 120. The round holes 345B become the round holes 345 as they are. The subsequent steps conform to the honeycomb electrode 120, and hence the description thereof is omitted.

Figure 10:
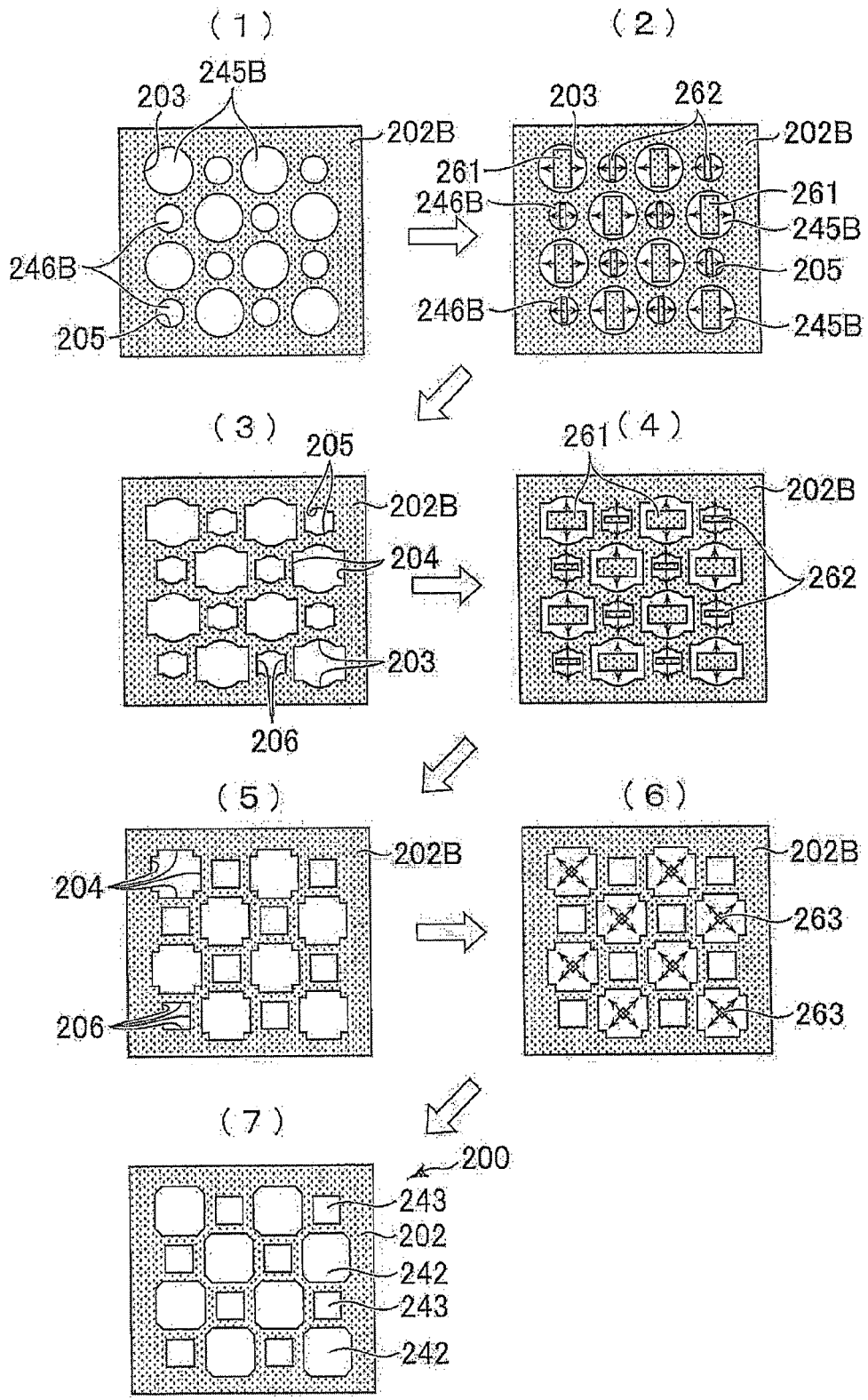
FIG. 10 is a plan view schematically showing still another embodiment of the manufacturing method of the electrode for the honeycomb structure forming die according to the present invention, and showing steps in order.

The manufacturing of the honeycomb electrodes 120 and 300 has been described above as the examples to describe the method of manufacturing the electrode for the honeycomb structure forming die according to the present invention. However, in the electrode for the honeycomb structure forming die according to the present invention, the shapes of each of the electrode cells are not the hexagonal shape, but may be an octagonal shape and a quadrangular shape. Hereinafter, there will be described a case where the shapes of the electrode cells of the honeycomb electrode are a large octagonal shape and a small quadrangular shape, with reference to FIG. 10. FIG. 10 is a schematic view drawn to facilitate the understanding of steps, and needless to say, the number of the electrode cells shown in FIG. 10 is not necessarily a practically appropriate number.

First, in the same manner as in the honeycomb electrode 120, there is prepared a thick plate-like electrode base body which is made of an electricity discharging material and has two main surfaces. Next, large round holes 245B and small round holes 246B are made as through holes in the electrode base body, to obtain an electrode base body 202B (see (1) of FIG. 10).

Then, each of processing electrodes 261 having a prism shape is inserted into, for example, about a half of a depth of each of the round holes 245B, specifically, from about 1 to 10 mm, and each of processing electrodes 262 having a prism shape is similarly inserted into about a half of a depth of each of the round holes 246B, specifically, from about 1 to 10 mm. When a combtooth-like electrode is used in which the plurality of processing electrodes 261 and 262 are integrated through a support portion, these operations can be performed at a time. Alternatively, the processing may be performed by using separate combtooth-like electrodes. Then, the inserted processing electrodes 261 discharge electricity from the insides of the round holes 245B toward hole side surfaces 203 of the electrode base body 202B, to process the hole side surfaces 203 of the electrode base body 202B. Similarly, the inserted processing electrodes 262 discharge the electricity from the insides of the round holes 246B toward hole side surfaces 205 of the electrode base body 202B, to process the hole side surfaces 205 of the electrode base body 202B (see (2) of FIG. 10). During this electric discharge machining, the processing electrodes 261 and 262 are preferably moved in parallel along a direction shown by arrows in FIG. 10(2). This also applies to (4) and (6) of FIG. 10. By this parallel movement, the processing electrodes 261 and 262 come close to the opposing hole side surfaces 203 and 205, to process the surfaces into flat surfaces, respectively. Then, after this first electric discharge machining, the opposing hole side surfaces 203 and 205 partially become flat surfaces 204 and 206 (see (3) of FIG. 10).

Then, an angle is changed as much as 90° from the state of FIG. 10(2), to similarly insert the processing electrodes 261 and 262, thereby discharging the electricity toward the hole side surfaces 203 and 205 of the electrode base body 202B to process the surfaces (see (4) of FIG. 10). After this second electric discharge machining, the hole side surfaces 203 of the round holes 245B and the hole side surfaces 205 of the small round holes 246B except four corners become the flat surfaces 204 and 206, respectively. A section of about the half (specifically, from about 1 to 10 mm) of each of the round holes 245B and 246B in a depth direction, which is vertical to the depth direction, has a shape close to a quadrangular shape (see (5) of FIG. 10). Moreover, the hole side surfaces 205 of the round holes 246B becomes the flat surfaces 206. In this case, a section of the half of each of the round holes 246B in the depth direction which is vertical to the depth direction, specifically, about 1 to 10 mm, has a quadrangular shape (see (5) of FIG. 10).

Next, each of small processing electrodes 263 (as compared with the processing electrodes 261 and 262) is inserted only into the round holes 245B i.e., the original round holes, although the holes strictly are not already the round holes by the processing to about a half, specifically, from about 1 to 10 mm of a depth, to discharge the electricity toward the four corners, i.e., all the corner portions of the above quadrangular shape (see (6) of FIG. 10). By this electric discharge machining, the flat surfaces are formed in the four corners of the quadrangular shape. Finally, about the half of each round hole 245B in the depth direction becomes an octagonal electrode cell 242. About the half of the round hole 246B in the depth direction becomes a quadrangular electrode cell 243. Thus, a honeycomb electrode 200 consisted of an electrode base body 202 can be obtained (see (7) of FIG. 10). It is to be noted that the remaining portions of the round holes 245B and 246B in the depth direction become the round holes as they are. However, in FIG. 10, there are not drawn (are omitted) the portions which become the round holes as they are.

As described above, all or part of the shape corresponding to the end surface shape of the honeycomb structure appears on the surface of the honeycomb electrode on which the electrode cells appear. Therefore, the honeycomb electrode 200 is used for preparing the forming die, when obtaining the honeycomb structure including octagonal flow-through cells each having a large sectional shape and quadrangular flow-through cells each having a small sectional shape.

[Method of Manufacturing Honeycomb Structure Forming Die]

There will be described, as an example, a case where the die 1 (see FIG. 2A to FIG. 2C) is manufactured by using the honeycomb electrode 120 as an example of the honeycomb electrode. First, there is prepared a thick plate-like die base body which is made of, for example, a commercially available stainless steel alloy (SUS630) and has two surfaces and in which any introduction hole or slit is not provided. This die base body becomes the die base body 2, when the introduction holes 4 and the slits 5 are provided.

Next, the introduction holes 4 which are open in the thickness direction are formed in the die base body by known means, for example, electrolytic machining (ECM), electric discharge machining (EDM), laser processing, machining such as drilling, or the like. The introduction holes 4 are formed at such positions as to communicate with intersecting portions of the slits 5 formed later and each having a hexagonal shape (see FIG. 2C). According to the die 1 obtained in this manner, when the extrusion forming is performed, the forming raw material introduced through the introduction holes 4 can uniformly be spread over all the slits 5, and excellent forming properties can be realized.

Then, the electric discharge machining is performed from the surface of the die base body opposite to the surface thereof provided with the introduction holes 4 by use of the honeycomb electrode 120, to form the slits 5. In consequence, the die 1 having a complementary shape to the honeycomb electrode 120 can be obtained (see (7) and (8) of FIG. 9). This electric discharge machining can be performed while pressing the honeycomb electrode 120 onto the surface of the die base body opposite to the surface thereof provided with the introduction holes 4, by use of a usual NC electric discharge machine and an electric discharge machining oil.

It is to be noted that, for example, the honeycomb electrode 120 includes the fringe portion. Therefore, in actual, the configuration, the number and the like of the electrode cells and electrode partition walls of the electrode are determined on the basis of the specifications (the configuration, the number and the like of the slits) of the die 1 to be obtained as described above.

[Method of Manufacturing Honeycomb Structure]

First, a cordierite forming raw material obtained by mixing, for example, alumina, kaolin and talc is used. For example, 5 parts by mass of binder such as methylcellulose or the like and 20 parts by mass of dispersion medium such as water or the like are mixed with 100 parts by mass of cordierite forming raw material, followed by kneading, to obtain a kneaded clay.

Next, when the obtained kneaded clay is extruded by the extrusion forming machine to which the die 1 is attached, the kneaded clay introduced through the introduction holes 4 moves toward the slits 5, and is extruded through openings of the slits 5 on a side opposite to the introduction holes 4, to obtain a honeycomb formed body. Then, the honeycomb formed body is fired, whereby the honeycomb structure 40 can be obtained as an example of the honeycomb structure.

It is to be noted that in the die for preparing the honeycomb structure or the honeycomb formed body at a time, the configuration, the number and the like of the slits are determined on the basis of the specifications of the honeycomb structure, or the honeycomb formed body to be obtained; i.e., the configurations, the numbers and the like of the porous partition walls and flow-through cells in the same manner as in the relationship between the honeycomb electrode and the die. Moreover, a plurality of honeycomb formed bodies (segments) having a schematically prism shape are obtained by use of, for example, the die 1 having a configuration shown in FIG. 2C, and the articles are bonded. Afterward, an outer shape of the bonded formed bodies is processed into a columnar shape, whereby it is possible to obtain the honeycomb structure 40 shown in FIG. 1.

INDUSTRIAL APPLICABILITY

An electrode for a honeycomb structure forming die according to the present invention is preferably utilized for processing the die to be used in forming a honeycomb structure which is often used as a filter or a catalyst carrier.

EXPLANATION OF REFERENCE NUMERALS

1: die (honeycomb structure forming die)
2: die base body
4: introduction hole
5: slit
7: one surface (of the die base body)
8: the other surface (of the die base body)
40: honeycomb structure
41: porous partition wall
42: flow-through cell
100, 110, 120, 200, 300 and 410: honeycomb electrode (electrode for the honeycomb structure forming die)
102, 112, 122, 202 and 302: electrode base body
103, 203 and 205: hole side surface
104, 204 and 206: flat surface
107, 117, 127 and 307: one surface (of the electrode base body)
108, 118, 128 and 308; the other surface (of the electrode base body)
122B, 202B and 302B: electrode base body (in a preparation step)
127B and 307B: one surface (of the electrode base body in the preparation step)
128B and 308B: the other surface (of the electrode base body in the preparation step)
141 and 341: electrode partition wall
142, 242, 243 and 342: electrode cell
145 and 345: round holes (formed (open) in the electrode base body)
145B, 245B and 246B: round hole ((passing through the electrode base body) in the preparation step)
149: round hole (which are formed in the electrode base body (and are not open))
160: combtooth-like electrode (including a plurality of processing electrodes)
161, 261, 262 and 263: processing electrode
162: support portion (of the combtooth-like electrode which integrates the plurality of processing electrodes)
344B and 345B: round hole ((which does not pass through the electrode base body) in the preparation step)
301 and 401: cutting line

The invention claimed is:

1. An electrode for a honeycomb structure forming die which forms a honeycomb structure having a peripheral surface and two end surfaces, a column-like shape, and a plurality of flow-through cells partitioned by porous partition walls, the electrode comprising:
    a thick plate-like electrode base body made of an electricity discharging material and having two main surfaces, only one of the two main surfaces of the electrode base body being provided with a plurality of electrode cells partitioned by electrode partition walls,
    wherein a shape of the electrode cells in the one surface corresponds to that of the flow-through cells of the honeycomb structure,
    wherein bottom portions of the electrode cells provided only in the one surface of the electrode base body further include holes formed so as to be directed toward the other surface of the two main surfaces of the electrode base body, and
    wherein a central axis of each of the holes and a central axis of each of the electrode cells are not positioned along the same line.

2. The electrode for the honeycomb structure forming die according to claim 1, wherein the holes are open toward the other surface.

3. The electrode for the honeycomb structure forming die according to claim 2, wherein the holes and the electrode cells are provided in pairs.

4. The electrode for the honeycomb structure forming die according to claim 1, wherein the holes and the electrode cells are provided in pairs.

5. The electrode for the honeycomb structure forming die according to claim 1, wherein each of the holes is provided for a plurality of electrode cells.

6. The electrode for the honeycomb structure forming die according to claim 1, wherein a thickness of each of the electrode partition walls is 0.01 mm or larger but smaller than 0.3 mm.

7. The electrode for the honeycomb structure forming die according to claim 1, wherein the shape of the electrode cells is a hexagonal shape.

8. The electrode for the honeycomb structure forming die according to claim 1, wherein the shapes of the electrode cells are an octagonal shape and a quadrangular shape.

9. An electrode for a honeycomb structure forming die which forms a honeycomb structure having a peripheral surface and two end surfaces, a column-like shape, and a plurality of flow-through cells partitioned by porous partition walls, the electrode comprising:
- a thick plate-like electrode base body made of an electricity discharging material and having two main surfaces, only one of the two main surfaces of the electrode base body being provided with a plurality of electrode cells partitioned by electrode partition walls,
- wherein a shape of the electrode cells in the one surface corresponds to that of the flow-through cells of the honeycomb structure,
- wherein bottom portions of the electrode cells provided only in the one surface of the electrode base body further include holes formed so as to be directed to the other surface of the two main surfaces of the electrode base body,
- wherein the holes are open toward the other surface, and
- wherein each of the holes is provided for a plurality of electrode cells.

10. The electrode for the honeycomb structure forming die according to claim 9, wherein the holes and the electrode cells are provided in pairs.

11. The electrode for the honeycomb structure forming die according to claim 9, wherein a central axis of each of the holes and a central axis of each of the electrode cells are not positioned along the same line.

12. The electrode for the honeycomb structure forming die according to claim 9, wherein a thickness of each of the electrode partition walls is 0.01 mm or larger but smaller than 0.3 mm.

13. The electrode for the honeycomb structure forming die according to claim 9, wherein the shape of the electrode cells is a hexagonal shape.

14. The electrode for the honeycomb structure forming die according to claim 9, wherein the shapes of the electrode cells are an octagonal shape and a quadrangular shape.

* * * * *